(12) United States Patent
Lin et al.

(10) Patent No.: US 12,363,681 B2
(45) Date of Patent: Jul. 15, 2025

(54) DATA TRANSMISSION METHOD, DATA TRANSMISSION DEVICE, NON-TRANSITORY COMPUTER READABLE MEDIUM, AND CHIP

(71) Applicant: GUANGDONG OPPO MOBILE TELECOMMUNICATIONS CORP., LTD., Dongguan (CN)

(72) Inventors: Huei-Ming Lin, Taipei (TW); Zhenshan Zhao, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 403 days.

(21) Appl. No.: 17/731,540

(22) Filed: Apr. 28, 2022

(65) Prior Publication Data
US 2022/0264536 A1    Aug. 18, 2022

Related U.S. Application Data

(63) Continuation of application No. PCT/CN2020/130676, filed on Nov. 20, 2020.

(60) Provisional application No. 62/939,555, filed on Nov. 22, 2019.

(51) Int. Cl.
*H04W 72/02* (2009.01)
*H04L 1/1812* (2023.01)
*H04L 5/00* (2006.01)
*H04L 27/26* (2006.01)
*H04W 72/0453* (2023.01)
*H04W 72/20* (2023.01)

(52) U.S. Cl.
CPC .......... *H04W 72/02* (2013.01); *H04L 1/1812* (2013.01); *H04L 5/0053* (2013.01); *H04L 27/2607* (2013.01); *H04W 72/0453* (2013.01); *H04W 72/20* (2023.01)

(58) Field of Classification Search
CPC . H04W 72/02; H04W 72/20; H04W 72/0453; H04L 1/1812; H04L 5/0053; H04L 27/2607
See application file for complete search history.

(56) References Cited

U.S. PATENT DOCUMENTS

| | | | | |
|---|---|---|---|---|
| 2020/0288286 A1* | 9/2020 | Hwang | ............... | H04L 27/2607 |
| 2021/0288778 A1* | 9/2021 | Park | ..................... | H04L 1/1861 |
| 2022/0132471 A1* | 4/2022 | Hwang | .................. | H04W 72/20 |
| 2024/0364484 A1* | 10/2024 | Salim | .................... | H04L 5/0094 |

FOREIGN PATENT DOCUMENTS

CN    110445597 A    11/2019

OTHER PUBLICATIONS

First Office Action issued in corresponding Indian application No. 202217025054, mailed Sep. 7, 2022.
(Continued)

*Primary Examiner* — Michael Thier
*Assistant Examiner* — Nevena Zecevic Sandhu
(74) *Attorney, Agent, or Firm* — BAYES PLLC

(57) ABSTRACT

A data transmission method, a data transmission device, a non-transitory computer readable medium, and a chip for sidelink communication.

16 Claims, 1 Drawing Sheet determining an index of a PSFCH resource as a sidelink feedback resource    S100

(56) References Cited

OTHER PUBLICATIONS

Extended European Search Report issued in corresponding European application No. 20891197.4, mailed Oct. 17, 2022.
Lenovo et al., "Discussion on physical layer procedures for NR sidelink", R1-1912325, 3GPP TSG RAN WG1 #99 Reno, USA, Nov. 18-22, 2019.
International Search Report issued in corresponding International Application No. PCT/CN2020/130676 mailed Feb. 18, 2021, 23 pages.
PCT Written Opinion of the International Searching Authority issued in corresponding International Application No. PCT/CN2020/130676 mailed Feb. 18, 2021, 5 pages.
"3rd Generation Partnership Project; Technical Specification Group Radio Access Network; NR; Physical layer procedures for control (Release 16)", 3GPP TS 38.213 V16.2.0 (Jun. 2020), 176 pages.
"Discussion on physical layer procedures for NR sidelink", Agenda Item: 7.2.4.5, Source: LG Electronics, 3GPP TSG RAN WG1 Meeting #99, R1-1913237, Reno, USA, Nov. 18-22, 2019, 20 pages.
"3rd Generation Partnership Project; Technical Specification Group Radio Access Network; NR; Physical layer procedures for control (Release 15)", 3GPP TS 38.213 V15.5.0 (Mar. 2019), 104 pages.
"Discussion on physical layer procedures for NR sidelink", Agenda Item: 7.2.4.5, Source: LG Electronics, 3GPP TSG RAN WG1 Meeting, #99 R1-1912592, Reno, USA, Nov. 18-22, 2019, 19 pages.
"Corrections on Sidelink", Source to WG: Samsung, 3GPP TSG-RAN WG1 Meeting #102-e R1-2007454, e-Meeting, Aug. 17-28, 2020, 8 pages.
"Discussion on physical layer procedures for NR sidelink", Agenda Item: 7.2.4.5, Source: LG Electronics, 3GPP TSG RAN WG1 Meeting, #98 bis R1-, 1910783, Chongqing, China, Oct. 14-20, 2019, 23 pages.
"3rd Generation Partnership Project; Technical Specification Group Radio Access Network; NR; Multiplexing and channel coding (Release 15) The present", 3GPP TS 38.212 V15.5.0 (Mar. 2019), 98 pages.
"3rd Generation Partnership Project; Technical Specification Group Radio Access Network; NR; Multiplexing and channel coding (Release 16)", 3GPP TS 38.212 V16.2.0 (Jun. 2020), 146 pages.
"Corrections on 5G V2X sidelink features", 3GPP TSG-RAN WG1 Meeting #102-e, R1-2007453, e-Meeting, Aug. 17-28, 2020, 6 pages.
"3rd Generation Partnership Project; Technical Specification Group Radio Access Network; Medium Access Control (MAC) protocol specification (Release 16)", 3GPP TS 38.321 V16.1.0 (Jul. 2020), 150 pages.
"3rd Generation Partnership Project; Technical Specification Group Radio Access Network; NR; Medium Access Control (MAC) protocol specification (Release 15)", 3GPP TS 38.321 V15.5.0 (Mar. 2019), 77 pages.
"3rd Generation Partnership Project; Technical Specification Group Radio Access Network; NR; Physical layer measurements (Release 15)", 3GPP TS 38.215 V15.5.0 (Jun. 2019), 16 pages.
"3rd Generation Partnership Project; Technical Specification Group Radio Access Network; Physical layer procedures for data (Release 15)", 3GPP TS 38.214 V15.5.0 (Mar. 2019), 103 pages.
"3rd Generation Partnership Project; Technical Specification Group Radio Access Network; NR; Radio Resource Control (RRC) protocol specification (Release 15)", 3GPP TS 38.331 V15.5.0 (Mar. 2019), 489 pages.
"3rd Generation Partnership Project; Technical Specification Group Radio Access Network; NR; Physical channels and modulation (Release 15) The present", 3GPP TS 38.211 V15.5.0 (Mar. 2019), 92 pages.
"3rd Generation Partnership Project; Technical Specification Group Radio Access Network; Evolved Universal Terrestrial Radio Access (E-UTRA); Physical layer procedures (Release 15) The present", 3GPP TS 36.213 V15.5.0 (Mar. 2019), 546 pages.

\* cited by examiner

DATA TRANSMISSION METHOD, DATA TRANSMISSION DEVICE, NON-TRANSITORY COMPUTER READABLE MEDIUM, AND CHIP

CROSS-REFERENCE TO RELATED APPLICATION

This application is a continuation International Application No. PCT/CN2020/130676 filed on Nov. 20, 2020, which claims the priority of U.S. provisional application 62/939,555, filed on Nov. 22, 2019, the contents of which are incorporated herein by reference in their entireties.

TECHNICAL FIELD

The present disclosure relates to communication technology, in particular to a sidelink communication.

BACKGROUND

The statements in this section merely provide information related to the present disclosure and may not constitute prior art. Further, the content in this section may be used to define a concept related to the present disclosure.

For example, in 5th generation, new radio (5G-NR), sidelink communication, a user equipment (UE) could be involved in sidelink unicast or groupcast communication.

It may be necessary for the UE to determine an appropriate sidelink feedback resource.

SUMMARY

A data transmission method, a data transmission device, a computer program, a non-transitory computer readable medium, and a chip for sidelink communication.

BRIEF DESCRIPTION OF THE DRAWINGS

The drawings are used merely for illustration purposes but not for limiting the present disclosure.

DETAILED DESCRIPTION

Figures 1, 2:
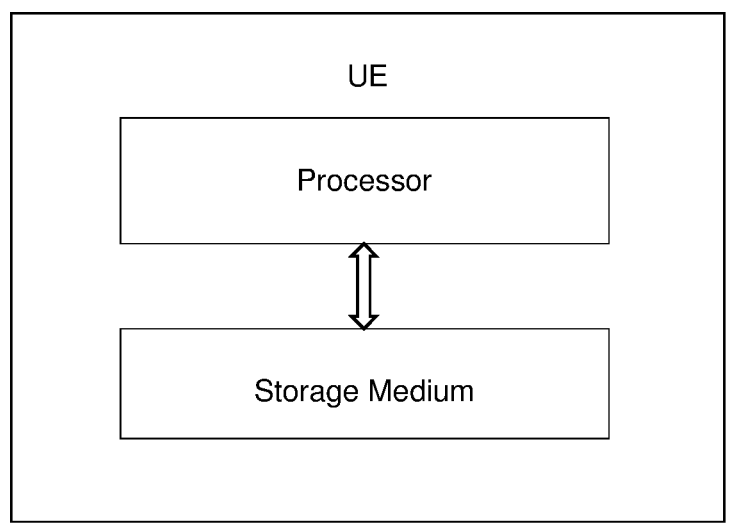
FIG. 1 shows a flow chart of a method.
FIG. 2 shows an exemplary UE.

In 5th generation (new radio, 5G-NR) sidelink communication, a user equipment (UE) may be involved in sidelink unicast or groupcast communication. When a sidelink message transmitting UE (Tx-UE) request the receiver UE (Rx-UE) to feedback a HARQ report (by enabling HARQ feedback) for the received message, the Rx-UE may determine or select an appropriate sidelink feedback resource to transmit the acknowledgement (ACK) and/or negative-acknowledgement (NACK) report, depending on the type of feedback option of either unicast, groupcast option 1, or groupcast option 2. It may be desired to do this in a manner such that transmission interference between multiple HARQ feedback UEs is minimized for groupcast option 2 (i.e., more than one UEs need to provide their HARQ reports for the same sidelink transmission simultaneously).

HARQ feedback option 1 may be an only-NACK HARQ reporting scheme in 3GPP standards for NR sidelink communication. HARQ feedback option 2 may be an ACK/NACK HARQ reporting scheme for a known group size in a groupcast in 3GPP standards for NR sidelink communication.

After a set of PSFCH candidate resources (i.e., PSFCH RBs) are configured and determined for a particular/corresponding PSCCH/PSSCH transmission, each PSFCH resource may be (for example first, for example as a first step of a PSFCH transmission procedure for the Rx-UE) indexed in the manner of frequency first and cyclic shift second. This may lead to a reduction of transmission interference between multiple HARQ feedback UEs.

For each Rx-UE to feedback its HARQ report, the Rx-UE may determine (in other words: select) an appropriate PSFCH resource according to the followings: For a PSFCH candidate resource set with Z physical resource blocks (PRBs) and Y cyclic shifted sequence pairs (number of PSFCH in a PRB) in each PRB, the Rx-UE selects a feedback PSFCH resource with the index $((K+M) \bmod (Z*Y))$ and use it for HARQ reporting, where K may be the L1 (physical layer) source ID (identifier) of the associated PSCCH/PSSCH, M may be the member ID for the Rx-UE for groupcast HARQ feedback option 2, M may be an integer between 0 and $X-1$, where X may be the group size of a groupcast session, wherein M=0 for unicast and groupcast HARQ feedback option 1. Furthermore, when $X>Z*Y$, groupcast HARQ feedback option 2 may not be used.

According to various embodiments, distribution of HARQ reports among multiple feedback UEs may be done by indexing PSFCH resources in a manner of frequency first and cyclic shift second to minimize transmission interference.

When there are more than one UEs need to provide HARQ feedback report for the same PSCCH/PSSCH transmission, the determination/selection of the actual/final PSFCH resource may be based on their member ID within a groupcast and layer 1 (physical layer) source ID to further randomize the interference.

According to various embodiments, when the size of a groupcast is more than the total number of candidate PSFCH resources, HARQ feedback option 2 with ACK/NACK feedback may be not used. Thus, according to various embodiments, the selection of HARQ feedback option 1 or 2 may be dependent on number of HARQ feedback UEs.

According to a method according to various embodiments, a feedback resource in physical sidelink feedback channel (PSFCH) may be determined for a message receiver user equipment (Rx-UE) to transmit its hybrid automatic repeat request (HARQ) report in NR sidelink communication. As described herein, according to various embodiments, each PSFCH resource may be first indexed in the manner of frequency first and cyclic shift second.

Indexing (in other words: mapping) of PSFCH resources in the manner of frequency first and cyclic shift second may provide that the feedback report from each member UE is distributed within a same group first in different PRBs before the code domain to minimize transmission interference between all feedback UEs.

As an illustrative example, if there are 3 PRBs, 2 cyclic shift pairs in each PRB, and 3 member UEs to transmit their HARQ feedback, according to the resource determination method described herein, the first member UE may select the 1st cyclic shift pair within the 1st PRB, the second member UE may select the 1st cyclic shift pair within the 2nd PRB, and the third member UE may select the 1st cyclic shift pair within the 3rd PRB. As such, their HARQ feedback reports may be distributed across different PRBs. If they were all selecting different cyclic shifted PSFCH within the same PRB, then their transmissions might interfere with each other.

The methods and devices according to various embodiments may be applied to 3GPP TS 38.213 v16.2.0 (2020-06) and RAN1 endorsed CR R1-2007454 for TS 38.213 (2020-08) as will be described in the following.

According to various embodiments, a UE procedure for reporting HARQ-ACK on sidelink may be provided.

A UE may be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE may provide HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool may be disabled.

A UE may expect that a slot $t'^{SL}_k$ ($0 \le k < T'_{max}$) has a PSFCH transmission occasion resource if k mod $N_{PSSCH}^{PSFCH}=0$, where $t'^{SL}_k$ may be defined in according to TS 38.214, and $T'_{max}$ may be a number of slots that belong to the resource pool within 10240 msec according to TS 38.214, and $N_{PSSCH}^{PSFCH}$ may be provided by sl-PSFCH-Period-r16.

A UE may be indicated by higher layers to not transmit a PSFCH in response to a PSSCH reception as defined in TS 38.321.

If a UE receives a PSSCH in a resource pool and the HARQ feedback enabled/disabled indicator field in an associated SCI format 2-A or a SCI format 2-B may have a value of 1, as defined in TS 38.212, and the UE may provide the HARQ-ACK information in a PSFCH transmission in the resource pool. The UE may transmit the PSFCH in a first slot that includes PSFCH resources and may be at least a number of slots, provided by sl-MinTimeGapPSFCH-r16, of the resource pool after a last slot of the PSSCH reception.

A UE may be provided by sl-PSFCH-RB-Set-r16 a set of $M_{PRB,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE may allocate the [(i+j· $N_{PSSCH}^{PSFCH}$)·$M_{subch,slot}^{PSFCH}$, (i+1+j·$N_{PSSCH}^{PSFCH}$)·$M_{subch,slot}^{PSFCH}$−1] PRBs from the $M_{PRB,set}^{PSFCH}$ PRBs to slot i among the PSSCH slots associated with the PSFCH slot and sub-channel j, where $M_{subch,slot}^{PSFCH} = M_{PRB,set}^{PSFCH}/(N_{subch} \cdot N_{PSSCH}^{PSFCH})$, $0 \le i < N_{PSSCH}^{PSFCH}$, $0 \le j < N_{subch}$, and the allocation may start in an ascending order of i and continues in an ascending order of j. The UE may expect that $M_{PRB,set}^{PSFCH}$ is a multiple of $N_{subch} \cdot N_{PSSCH}^{PSFCH}$.

A UE may determine a number of PSFCH resources available for multiplexing HARQ-ACK information in a PSFCH transmission as $R_{PRB,CS}^{PSFCH} = N_{type}^{PSFCH} \cdot M_{subch,slot}^{PSFCH} \cdot N_{CS}^{PSFCH}$ where $N_{CS}^{PSFCH}$ may be a number of cyclic shift pairs for the resource pool and, based on an indication by higher layers, $N_{type}^{PSFCH}=1$ and the $M_{subch,slot}^{PSFCH}$ PRBs may be associated with the starting sub-channel of the corresponding PSSCH; or $N_{type}^{PSFCH}=N_{subch}^{PSSCH}$ and the $N_{subch}^{PSSCH} \cdot M_{subch,slot}^{PSFCH}$ PRBs may be associated with one or more sub-channels from the $N_{subch}^{PSSCH}$ sub-channels of the corresponding PSSCH.

The PSFCH resources may be first indexed according to an ascending order of the PRB index, from the $N_{type}^{PSFCH} \cdot M_{subch,slot}^{PSFCH}$ PRBs, and the according to an ascending order of the cyclic shift pair index from the $N_{CS}^{PSFCH}$ cyclic shift pairs.

A UE may determine an index of a PSFCH resource for a PSFCH transmission in response to a PSSCH reception as $(P_{ID}+M_{ID})$ mod $R_{PRB,CS}^{PSFCH}$ where $P_{ID}$ may be a physical layer source ID provided by SCI format 2-A or 2-B (according to TS 38.212 and as described below), scheduling the PSSCH reception, and $M_{ID}$ (which may be referred to as member ID) may be the identity of the UE receiving the PSSCH as indicated by higher layers if the UE detects a SCI format 2-A with Cast type indicator field value of "01"; otherwise, $M_{ID}$ is zero.

A UE may determine a $m_0$ value, for computing a value of cyclic shift α according to TS 38.211, from a cyclic shift pair index corresponding to a PSFCH resource index and from $N_{CS}^{PSFCH}$ using Table 1.

TABLE 1

Set of cyclic shift pairs.

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE may determine a $m_{CS}$ value, for computing a value of cyclic shift α according to TS 38.211, as illustrated in Table 2 if the UE detects a SCI format 2-A with Cast type indicator field value of "01" or "10", or as illustrated in Table 3 if the UE detects a SCI format 2-B or a SCI format 2-A with Cast type indicator field value of "11". The UE may apply one cyclic shift from a cyclic shift pair to a sequence used for the PSFCH transmission according to TS 38.211.

TABLE 2

Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

TABLE 3

Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

The methods and devices according to various embodiments may be applied to 3GPP TS 38.212 v16.2.0 (2020-06) and RAN1 endorsed CR R1-2007453 for TS 38.212 (2020-08) as will be described in the following. 2nd-stage SCI formats may be as described in the following. For example, SCI format 2-A may be as described in the following.

SCI format 2-A may be used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:
HARQ process number—4 bits;
New data indicator—1 bit;
Redundancy version—2 bits;
Source ID—8 bits (which may be the physical layer source ID used in the pre-determined formula as described herein);
Destination ID—16 bits;
HARQ feedback enabled/disabled indicator—1 bit, for example as defined herein above;
Cast type indicator—2 bits, for example as defined in Table 4; and
CSI request—1 bit.

TABLE 4

| Cast type indicator | |
|---|---|
| Value of Cast type indicator | Cast type |
| 00 | Broadcast |
| 01 | Groupcast when HARQ-ACK information includes ACK or NACK |
| 10 | Unicast |
| 11 | Groupcast when HARQ-ACK information includes only NACK |

The methods and devices according to various embodiments may be applied to TS 38.321 v16.1.0 (2020 July) as will be described in the following. Sidelink HARQ operation, in particular operation of sidelink HARQ entity will be described.

A delivered sidelink grant and its associated Sidelink transmission information may be associated with a Sidelink process. Each Sidelink process may supports one TB (transport block).

For each sidelink grant, the Sidelink HARQ Entity shall:

```
1>  if the MAC entity determines that the sidelink grant is used for initial
transmission; or
    1>  if no MAC PDU (Protocol Data Unit) has been obtained:
        2>  associate a Sidelink process to this grant, and for each associated
        Sidelink process:
            3>  obtain the MAC PDU to transmit from the Multiplexing and
            assembly entity, if any;
            3>  if a MAC PDU to transmit has been obtained:
                4>  if a HARQ Process ID has been set for the sidelink
                grant:
                    5>  associate the HARQ Process ID
                    corresponding to the sidelink grant to the associated
                    Sidelink process;
                4>  determines Sidelink transmission information of the TB for
                the source and destination pair of the MAC PDU as follows:
                    5>  set the Source Layer-1 ID to the 8 LSB of the Source
                    Layer-2 ID of the MAC PDU;
                    5>  set the Destination Layer-1 ID to the 16 LSB of the
                    Destination Layer-2 ID of the MAC PDU;
                    5>  consider the NDI to have been toggled and set the
                    NDI to the toggled value;
                    5>  associate the Sidelink process to a Sidelink process
                    ID;
                    5>  set the cast type to one of broadcast, groupcast and
                    unicast as indicated by upper layers;
                    5>  if sl-HARQ-FeedbackEnabled has been set to
                    Enabled for the logical channel(s) in the MAC PDU;
                        6>  enable HARQ feedback.
                    5>  else:
                        6>  disable HARQ feedback.
                    5>  set the priority to the value of the highest priority of
                    the logical channel(s) and a MAC CE, if any, if included, in the
                    MAC PDU;
                    5>  if HARQ feedback is enabled for groupcast:
                        6>  if both a group size and a member ID are
                        provided by upper layers and the group size is not greater
                        than the number of candidate PSFCH resources associated
                        with this sidelink grant:
                            7>  select either positive-negative
                            acknowledgement or negative-only
                            acknowledgement.
                        6>  else:
                            7>  select negative-only acknowledgement.
```

```
    6>  if negative-only acknowledgement is
selected, UE's location information is available, and sl-
TransRange has been configured for a logical channel in the
MAC PDU, and Zone id is determined as specified in TS
38.331:
        7>  set the communication range
    requirement to the value of the longest
    communication range of the logical channel(s) in the
    MAC PDU, if configured;
        7>  set Zone_id to the value of the
    determined Zone_id.
```

It is to be noted that for the configured grant Type 1 and 2, only one new TB can be transmitted in a periodicity of the configured grant.

It is to be noted that the initial value of the NDI set to the very first transmission for the Sidelink HARQ Entity may be left to UE implementation.

It is to be noted that how UE determine Sidelink process ID in SCI may be left to UE implementation for NR sidelink.

As described above, a method for feedback resource determination in NR sidelink communication may be provided. According to various embodiments, an appropriate sidelink feedback PSFCH resource may be determined for a NR sidelink communicating Rx-UE. The method may be applied to Vehicles/cars and user devices (smartphones) equipped with 3GPP Release 16 or beyond 5G NR-V2X capable communication modem chipset. Various embodiments may be implemented in a vehicle UE and/or a gNB.

FIG. 1 shows a flow diagram illustrating a data transmission method according to various embodiments. The method may be performed by a device, wherein the device is configured for sidelink communication. At S120, an index of a PSFCH resource may be determined as a sidelink feedback resource. PSFCH resources may be first indexed according to a frequency resource block and second according to a cyclic shift pair. A cyclic shift pair may include a pair of two cyclic shifted sequences to represent ACK and NACK information, or only-NACK information. One or more cyclic shift pairs may be configured per frequency resource block.

According to various embodiments, the index may be determined based on a physical layer source ID of the associated PSCCH/PSSCH.

According to various embodiments, the index may be determined based on a member ID of the device.

According to various embodiments, the index may be determined based on a number of physical resource blocks.

According to various embodiments, the index may be determined based on a number of cyclic shifted pairs in each physical resource block for a resource pool.

According to various embodiments, the index may be determined based on a pre-determined formula.

According to various embodiments, the pre-determined formula may be based on a physical layer source ID of the associated PSCCH/PSSCH, a member ID of the device, a number of physical resource blocks, and a number of cyclic shifted pairs in each physical resource block for a resource pool.

According to various embodiments, the pre-determined formula may be $I=(K+M)\bmod(Z*Y)$, wherein I may be the index, K may be the physical layer source ID of the associated PSCCH/PSSCH, M may be the member ID of the device, Z may be the number of physical resource blocks, and Y may be the number of cyclic shifted pairs in each physical resource block for a resource pool.

According to various embodiments, the device may include or may be a user equipment, UE, and the sidelink communication comprises communication between the user equipment and another user equipment.

According to various embodiments, the sidelink communication may include or may be communication according to 3GPP standard TS 36.213 for sidelink communication.

According to various embodiments, the sidelink communication may include or may be communication according to 3GPP standard TS 38.212 for sidelink communication and/or to 3GPP standard TS 38.321 for sidelink communication.

According to various embodiments, the sidelink feedback resource may be used to transmit an ACK report and/or a NACK report.

According to various embodiments, the sidelink feedback resource may be used to transmit a feedback using unicast.

According to various embodiments, the sidelink feedback resource may be used to transmit a feedback using groupcast option 1.

According to various embodiments, the sidelink feedback resource may be used to transmit a feedback using groupcast option 2.

A device configured to carry out the method as described herein may be provided, for example a UE as shown in FIG. 2.

According to various embodiments, the device may include transmitting means configured to transmit data using sidelink communication; and receiving means configured to receive data using sidelink communication.

According to various embodiments, the device may include one or more processors and one or more memory storing program instructions, the device being configured, when the program instructions are executed by the one or more processors, to carry out the method as described herein.

A computer program containing program instructions which, when executed by one or more processors in a device, cause the device to carry out the method as described herein may be provided.

A carrier (for example a computer readable medium) for carrying the computer program as described herein may be provided.

The following References may be helpful for understanding the present disclosure:

[1] 3GPP TS 38.211 V15.5.0: "NR; Physical channels and modulation"
[2] 3GPP TS 38.212 V15.5.0: "NR; Multiplexing and channel coding"
[3] 3GPP TS 38.213 V15.5.0: "NR; Physical layer procedures for control"
[4] 3GPP TS 38.214 V15.5.0: "NR; Physical layer procedures for data"
[5] 3GPP TS 38.215 V15.5.0: "NR; Physical layer measurements"

-continued

[6] 3GPP TS 38.321 V15.5.0: "NR; Medium Access Control (MAC) protocol specification"
[7] 3GPP TS 38.331 V15.5.0: "NR; Radio Resource Control (RRC) protocol specification"

Some of the abbreviations used in this present disclosure are listed below:

| | |
|---|---|
| 3GPP | 3$^{rd}$ Generation Partnership Project |
| 5G | 5$^{th}$ Generation |
| NR | New Radio |
| RRC | Radio Resource Control |
| MAC | Media Access Control |
| PSFCH | Physical sidelink feedback channel |
| PSSCH | Physical sidelink shared channel |
| PSCCH | Physical sidelink control channel |
| PDU | Protocol Data Unit |
| RB | Resource Block |
| RSRP | Reference signal received power |
| SCI | Sidelink Control Information |
| SL | Sidelink |
| TB | Transport block |
| Tx | Transmission |
| Rx | Receive |
| ACK | Acknowledgement |
| NACK | Negative acknowledgement |
| HARQ | Hybrid automatic repeat request |

Clauses:
1. A data transmission method performed by a device, wherein the device is configured for sidelink communication, the method comprising:
determining an index of a PSFCH resource as a sidelink feedback resource;
wherein PSFCH resources are first indexed according to a frequency resource block and second according to a cyclic shift pair.
2. The data transmission method of clause 1,
wherein the index is determined based on a physical layer source ID of the associated PSCCH/PSSCH.
3. The data transmission method of at least one of clauses 1 or 2,
wherein the index is determined based on a member ID of the device.
4. The data transmission method of at least one of clauses 1 to 3,
wherein the index is determined based on a number of physical resource blocks.
5. The data transmission method of at least one of clauses 1 to 4,
wherein the index is determined based on a number of cyclic shifted pairs in each physical resource block for a resource pool.
6. The data transmission method of at least one of clauses 1 to 5,
wherein the index is determined based on a pre-determined formula.
7. The data transmission method of at least one of clauses 1 to 6,
wherein the pre-determined formula is based on a physical layer source ID of the associated PSCCH/PSSCH, a member ID of the device, a number of physical resource blocks, and a number of cyclic shifted pairs in each physical resource block for a resource pool.
8. The data transmission method of clause 7,
wherein the pre-determined formula is $I=(K+M) \bmod (Z*Y)$,
wherein I is the index, K is the physical layer source ID of the associated PSCCH/PSSCH, M is the member ID of the device, Z is the number of physical resource blocks, and Y is the number of cyclic shifted pairs in each physical resource block for a resource pool.
9. The data transmission method of at least one of clauses 1 to 8,
wherein the device comprises a user equipment, UE, and the sidelink communication comprises communication between the user equipment and another user equipment.
10. The data transmission method of at least one of clauses 1 to 9,
wherein the sidelink communication comprises communication according to 3GPP standard TS 36.213 for sidelink communication.
11. The data transmission method of at least one of clauses 1 to 10,
wherein the sidelink communication comprises communication according to 3GPP standard TS 38.212 for sidelink communication and/or to 3GPP standard TS 38.321 for sidelink communication.
12. The data transmission method of at least one of clauses 1 to 11,
wherein the sidelink feedback resource is used to transmit an ACK report and/or a NACK report.
13. The data transmission method of at least one of clauses 1 to 12,
wherein the sidelink feedback resource is used to transmit a feedback using unicast.
14. The data transmission method of at least one of clauses 1 to 12,
wherein the sidelink feedback resource is used to transmit a feedback using groupcast option 1.
15. The data transmission method of at least one of clauses 1 to 12,
wherein the sidelink feedback resource is used to transmit a feedback using groupcast option 2.
16. A data transmission device, wherein the device is configured for sidelink communication, the device comprising:
a processing module configured to determine an index of a PSFCH resource as a sidelink feedback resource;
wherein PSFCH resources are first indexed according to a frequency resource block and second according to a cyclic shift pair.
17. The device of clause 16,
wherein the index is determined based on a physical layer source ID of the associated PSCCH/PSSCH.
18. The device of at least one of clauses 16 or 17,
wherein the index is determined based on a member ID of the device.
19. The device of at least one of clauses 16 to 18,
wherein the index is determined based on a number of physical resource blocks.
20. The device of at least one of clauses 16 to 19,
wherein the index is determined based on a number of cyclic shifted pairs in each physical resource block for a resource pool.
21. The device of at least one of clauses 16 to 20,
wherein the index is determined based on a pre-determined formula.
22. The device of at least one of clauses 16 to 21,
wherein the pre-determined formula is based on a physical layer source ID of the associated PSCCH/PSSCH, a member ID of the device, a number of physical resource blocks, and a number of cyclic shifted pairs in each physical resource block for a resource pool.

23. The device of clause 22,
wherein the pre-determined formula is I=(K+M)mod (Z*Y), wherein I is the index, K is the physical layer source ID of the associated PSCCH/PSSCH, M is the member ID of the device, Z is the number of physical resource blocks, and Y is the number of cyclic shifted pairs in each physical resource block for a resource pool.

24. The device of at least one of clauses 16 to 23,
wherein the device comprises a user equipment, UE, and the sidelink communication comprises communication between the user equipment and another user equipment.

25. The device of at least one of clauses 16 to 24,
wherein the sidelink communication comprises communication according to 3GPP standard TS 36.213 for sidelink communication.

26. The device of at least one of clauses 16 to 25,
wherein the sidelink communication comprises communication according to 3GPP standard TS 38.212 for sidelink communication and/or to 3GPP standard TS 38.321 for sidelink communication.

27. The device of at least one of clauses 16 to 26,
wherein the sidelink feedback resource is used to transmit an ACK report and/or a NACK report.

28. The device of at least one of clauses 16 to 27,
wherein the sidelink feedback resource is used to transmit a feedback using unicast.

29. The device of at least one of clauses 16 to 27,
wherein the sidelink feedback resource is used to transmit a feedback using groupcast option 1.

30. The device of at least one of clauses 16 to 27,
wherein the sidelink feedback resource is used to transmit a feedback using groupcast option 2.

31. A data transmission apparatus, comprising one or more processors and one or more memory storing program instructions, the device being configured, when the program instructions are executed by the one or more processors, to carry out the method of any one of clauses 1 to 15.

32. A computer program containing program instructions which, when executed by one or more processors in a device, cause the device to carry out the method of any one of clauses 1 to 15.

33. A non-transitory computer-readable medium, comprising instructions executed by a processor to carry out the method of any one of clauses 1 to 15.

34. A chip, comprising one or more processors configured to execute program instructions stored in one or more memory to carry out the method of any one of clauses 1 to 15.

It should be understood that the present disclosure is not limited by any of the details of the foregoing description, but rather should be construed broadly based on the principle as defined in the appended claims. Therefore, all changes and modifications that fall within the scope of the claims, or equivalences thereof are intended to be embraced by the scope of protection.

The invention claimed is:

1. A data transmission method performed by a device, wherein the device is configured for sidelink communication, the method comprising:
determining an index of a Physical Sidelink Feedback Channel (PSFCH) resource as a sidelink feedback resource;
wherein PSFCH resources are first indexed according to a frequency resource block and second according to a cyclic shift pair;
wherein the index is determined based on a pre-determined formula; and
wherein the pre-determined formula is based on a physical layer source ID of an associated Physical Sidelink Control Channel (PSCCH)/Physical Sidelink Shared Channel (PSSCH), a member ID of the device, a number of physical resource blocks, and a number of cyclic shifted pairs in each physical resource block for a resource pool.

2. The data transmission method of claim 1,
wherein the index is determined based on a physical layer source ID of the associated Physical Sidelink Control Channel (PSCCH)/Physical Sidelink Shared Channel (PSSCH).

3. The data transmission method of claim 1,
wherein the index is determined based on a member ID of the device.

4. The data transmission method of claim 1,
wherein the index is determined based on a number of physical resource blocks.

5. The data transmission method of claim 1,
wherein the index is determined based on a number of cyclic shifted pairs in each physical resource block for a resource pool.

6. The data transmission method of claim 1,
wherein the pre-determined formula is I=(K+M)mod (Z*Y); and
wherein I is the index, K is the physical layer source ID of the associated PSCCH/PSSCH, M is the member ID of the device, Z is the number of physical resource blocks, and Y is the number of cyclic shifted pairs in the each physical resource block for the resource pool.

7. The data transmission method of claim 1,
wherein the sidelink feedback resource is used to transmit an ACK report and/or a NACK report.

8. The data transmission method of claim 1,
wherein the sidelink feedback resource is used to transmit a feedback using unicast.

9. The data transmission method of claim 1,
wherein the sidelink feedback resource is used to transmit a feedback using groupcast option 1.

10. The data transmission method of claim 1,
wherein the sidelink feedback resource is used to transmit a feedback using groupcast option 2.

11. A data transmission apparatus, comprising one or more processors and one or more memory storing program instructions, the apparatus being configured, when the program instructions are executed by the one or more processors, to carry out a data transmission method, the method comprising:
determining an index of a Physical Sidelink Feedback Channel (PSFCH) resource as a sidelink feedback resource;
wherein PSFCH resources are first indexed according to a frequency resource block and second according to a cyclic shift pair;
wherein the index is determined based on a pre-determined formula; and
wherein the pre-determined formula is based on a physical layer source ID of an associated Physical Sidelink Control Channel (PSCCH)/Physical Sidelink Shared Channel (PSSCH), a member ID of the device, a number of physical resource blocks, and a number of cyclic shifted pairs in each physical resource block for a resource pool.

12. The data transmission apparatus of claim 11,
wherein the pre-determined formula is I=(K+M)mod (Z*Y); and
wherein I is the index, K is the physical layer source ID of the associated PSCCH/PSSCH, M is the member ID of the device, Z is the number of physical resource blocks, and Y is the number of cyclic shifted pairs in the each physical resource block for the resource pool.

13. The data transmission apparatus of claim 11,
wherein the sidelink feedback resource is used to transmit an ACK report and/or a NACK report.

14. The data transmission apparatus of claim 11,
wherein the sidelink feedback resource is used to transmit a feedback using unicast.

15. A non-transitory computer-readable medium, comprising instructions executed by a processor to carry out a data transmission method, the method comprising:

determining an index of a Physical Sidelink Feedback Channel (PSFCH) resource as a sidelink feedback resource;
wherein PSFCH resources are first indexed according to a frequency resource block and second according to a cyclic shift pair;
wherein the index is determined based on a pre-determined formula; and
wherein the pre-determined formula is based on a physical layer source ID of an associated Physical Sidelink Control Channel (PSCCH)/Physical Sidelink Shared Channel (PSSCH), a member ID of the device, a number of physical resource blocks, and a number of cyclic shifted pairs in each physical resource block for a resource pool.

16. A chip, comprising one or more processors configured to execute program instructions stored in one or more memory to carry out the method of claim 1.

* * * * *